United States Patent [19]

Virtue

[11] Patent Number: 5,036,483

[45] Date of Patent: Jul. 30, 1991

[54] BINARY ADDING APPARATUS

[75] Inventor: Peter J. Virtue, Basingstoke, England

[73] Assignee: Sony Corporation, Tokyo, Japan

[21] Appl. No.: 471,473

[22] Filed: Jan. 29, 1990

[30] Foreign Application Priority Data

Apr. 7, 1989 [GB] United Kingdom ............... 8907873

[51] Int. Cl.⁵ .............................................. G06F 7/50
[52] U.S. Cl. .................................................... 364/786
[58] Field of Search ............................... 364/786, 787

[56] References Cited

U.S. PATENT DOCUMENTS

4,229,802 10/1980 Eggermont ........................ 364/786
4,584,661 4/1986 Grundland ........................ 364/787
4,683,548 7/1987 Mlynek ............................. 364/786

Primary Examiner—David H. Malzahn
Attorney, Agent, or Firm—Alvin Sinderbrand; William S. Frommer

[57] ABSTRACT

A binary adding apparatus adds together input words (A0-A7, B0-B7) to produce an output word (E0-E7). The apparatus includes a clock signal generator (CK) and adders (FA0-FA7) each connected to receive bits of equal significance of the input words and all having substantially the same propagation delay, the adders being interconnected in cascaded groups (e.g. FA0, FA1), in the order of significance of the bits of the input words, and the number of adders in each group being such that the total propagation delay through each group is less than the clock period. A first set of latches (A1/1-LA1/12) is connected to outputs of the adders (FA0-FA7), the set comprising respective latches (e.g. LA1/1) each connected to receive a sum bit of respective significance and respective latches (e.g. LA1/3) each connected to receive a carry-out bit from a respective one of the groups. An output set of latches (LA3-1-LA3/9) receives the bits of the output word. The latches of the first and output sets are controlled by the clock generator (CK) whereby all the latches output simultaneously, once per clock period, the bits supplied thereto. A processing assembly connected between the first set of latches and the output set of latches combines, during at least one clock period, the bits outputted by the first set of latches to produce the bits of the output word, the processing assembly including a plurality of logic units (L1-L14) each having a propagation delay which is less than the clock period, and each being operative to carry out one of a plurality of predetermined logic functions (F1-F5).

19 Claims, 4 Drawing Sheets

BINARY ADDING APPARATUS

BACKGROUND OF THE INVENTION

1. Field of the Invention

This invention relates to binary adding apparatus for adding together a plurality of multi-bit input words to produce a multi-bit output word.

2. Description of the Prior Art

Figure 1:
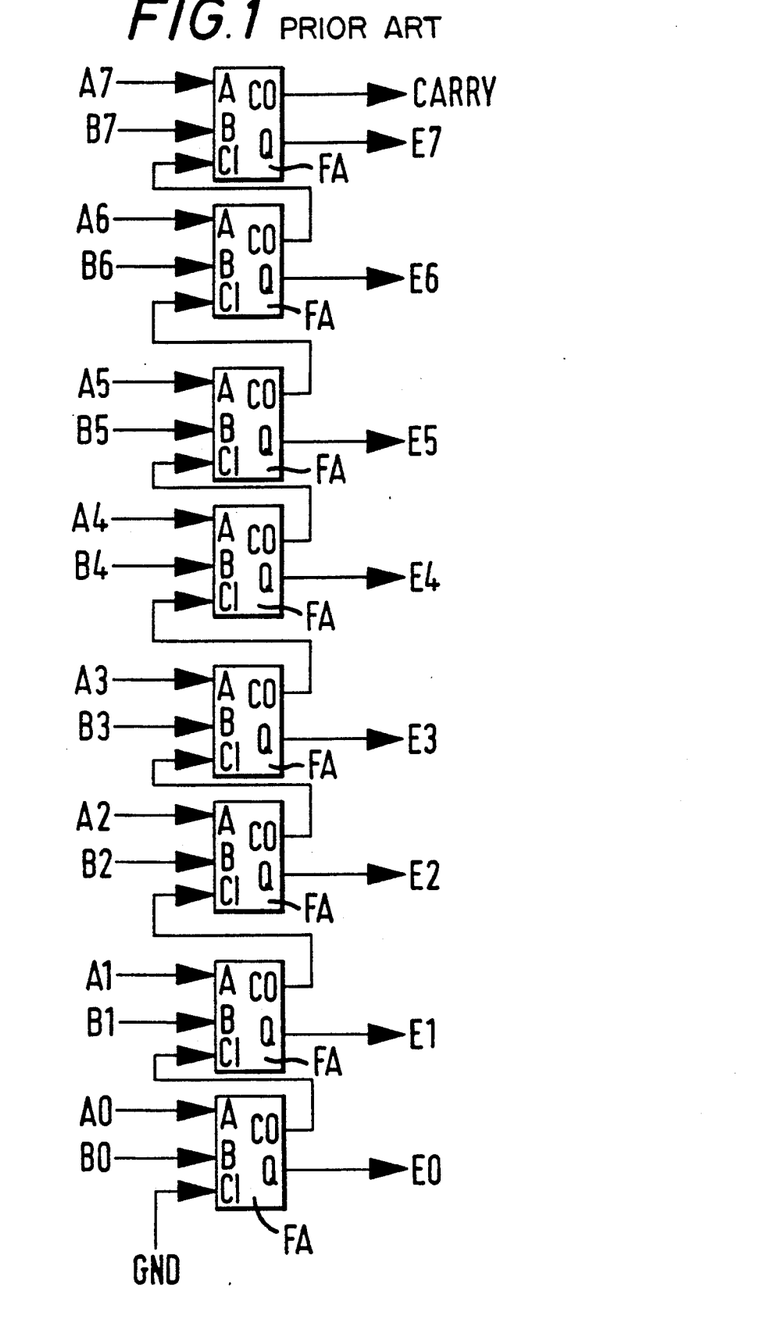
FIG. 1 is a block diagram of a binary adding apparatus for adding together two 8-bit input words, the apparatus comprising eight single-bit full adders connected in cascade.

FIG. 1 of the accompanying drawings shows how such an apparatus may be constructed. In the case of FIG. 1 it is assumed that, for example, two 8-bit input words are to be added, one of the words comprising bits A0 to A7 (in ascending order of significance) and the other of the words comprising bits B0 to B7 (in ascending order of significance). The apparatus comprises eight single-bit full adders FA each having inputs A and B, a carry-in input CI, a sum output Q and a carry-out output CO. The bits A0 to A7 and B0 to B7 of the input words are applied to the inputs A and B of the full adders FA as shown. The carry-in input CI of the full adder FA of least significance is connected to ground (GND). The full adders FA are connected in cascade. That is to say, the carry out output CO of each full adder FA (except, of course, for that of most significance) is connected to the carry-in input CI of the full adder of next highest significance. As will be evident, the result is that the full adders FA add the input words to produce an output word comprising eight bits E0 to E7, in ascending order of significance, together with a carry bit. As shown, the bits E0 to E7 are produced at the sum output terminals Q of the full adders FA, in ascending order of significance, with the carry bit being produced at the carry-out output CO of the full adder of most significance.

Due to the cascaded manner of connection of the full adders FA of the apparatus of FIG. 1, the time taken for the output word to be generated is the sum of the propagation delays of all eight full adders. This is because each full adder FA can only begin to operate when it receives a carry-out bit from the carry-out output CO of the full adder of immediately lower significance. That is, the output word is not generated until after the carry-out bits have propagated through from the least significant bit (LSB) to the most significant bit (MSB).

Figure 2:
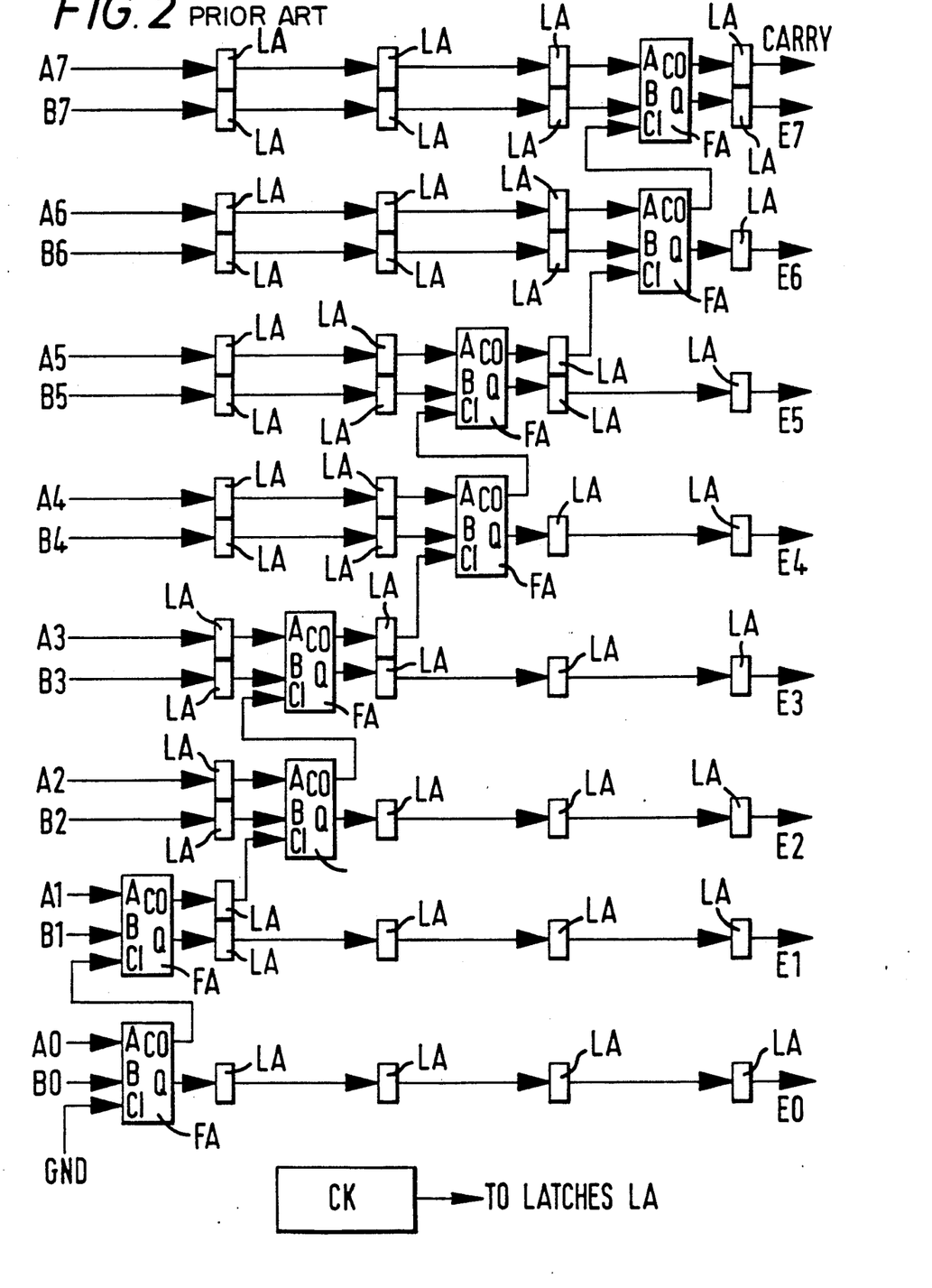
FIG. 2 is a block diagram of a pipelined binary adding apparatus for adding together two 8-bit words, the apparatus comprising four groups of two cascade-connected single-bit full adders each followed by a respective set of latches.

The above-described speed limitation may be overcome, at the cost of introducing considerable extra hardware into the apparatus, by using so-called pipelining architecture. According to this technique, the full adders are interconnected in cascaded groups, the number of full adders in each group being such that the total propagation delay through each group is less than a predetermined period. The groups are separated by sets of latches which are controlled by a clock generator, which produces a clock signal whose period is the above-mentioned predetermined period, whereby all the latches output simultaneously, once per clock period (i.e. on receipt of each clock pulse of the clock signal), the bits supplied thereto. FIG. 2 of the accompanying drawings shows such a pipelined adding apparatus might be constructed. The apparatus of FIG. 2, like that of FIG. 1, adds two 8-bit input words comprising bits A0 to A7 and B0 to B7, respectively, to produce an output word comprising bits E0 to E7 (and a carry bit). The apparatus of FIG. 2 comprises eight single-bit full adders FA like those of FIG. 1. Additionally, the apparatus of FIG. 2 comprises 48 latches LA which effect the pipelining and afford temporal pre-equalizing and post-equalizing of the bits to insure that the bits E0 to E7 (and the carry bit) of the output word have the same timing. The latches LA are arranged in first to fourth sets (each set comprising those latches shown mutually vertically aligned in FIG. 2) with an addition stage comprising a respective one of first to fourth groups of two cascaded full adders FA preceding each set. A clock generator CK is connected to all of the latches LA to supply thereto a clock signal comprising clock pulses spaced by a clock period which is greater than the sum of the propagation delays of the groups of cascaded full adders FA.

The apparatus of FIG. 2 functions as follows. Upon generation of a first clock pulse by the clock generator CK, the bits A0 to A7 and B0 to B7 of the input words are supplied to the apparatus as shown. The bits A2 to A7 and B2 to B7 go to pre-equalizing latches of the first set of latches LA. The bits A0, A1, B0 and B1 go to the inputs A and B of the first cascaded group of full adders FA. The total propagation delay through the first cascaded group of full adders FA is twice the propagation delay through one full adder, the propagation delay through all of the full adders being substantially the same. This total propagation delay is less than the clock period. Accordingly, prior to generation of the next clock pulse, the sum output bit and carry-out bit provided by the outputs Q and CO, respectively, of the full adder receiving the input bits A1 and B1, and the sum output bit of the full adder receiving the input bits A0 to B0, have been latched into associated latches of the first set of the latches LA.

When the next clock pulse is generated, the bits stored in the latches LA of the first set are outputted and, during the following clock period, the input bits A2, B2, A3 and B3 (and the carry-out bit from the preceding stage) are added in the second group of two cascaded full adders. This process is then repeated twice more whereby, after a total of four clock periods or cycles, an output word is developed at the output of the fourth set of latches LA. The pre-equalizing latches (those preceding the full adders) and the post-equalizing latches (those following the full adders) insure that the bits of the output words as outputted from the fourth set of latches have the same timing, in which regard it should be appreciated that bits of successive pairs of input words may be inputted during each successive clock cycle whereby an output word may be produced during each clock cycle.

Figure 3:
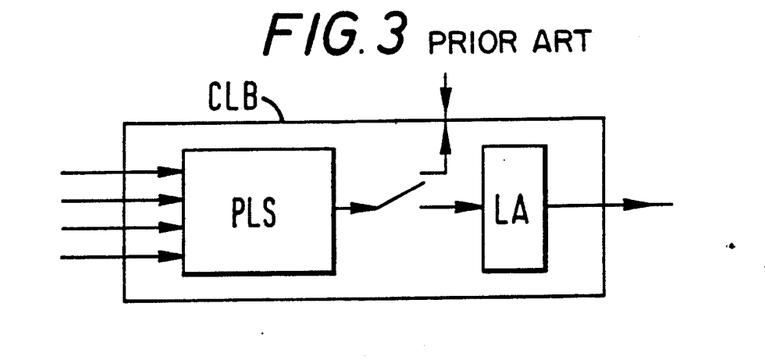
FIG. 3 is a block diagram of one configurable logic block (CLB) of an array thereof formed on a programmable gate array (PGA) chip.

The apparatus of FIG. 2 is subject to the following disadvantages. Firstly, it involves the use of a large number of latches. In this regard, the pre-equalizing latches are used very inefficiently because two latches are needed for each of the bits at each pipelining stage. For example, the bits A7 and B7 require the use of six equalizing latches before they are added together. Secondly, it involves a long delay (four clock periods or cycles) between input and output. While the number of latches and the delay might be reducible if it were possible to cascade more than two full adders between the sets of latches, the disadvantages will still remain. For any given number of cascaded adders in the successive stages, the above disadvantages tend to get worse if the number of bits of the input words is increased beyond eight. Further, the employment of a large number of latches involves a further disadvantage when the apparatus is embodied using one or more programmable gate arrays (PGAs), which are also known as programmable logic arrays. A PGA comprises a chip having an array of configurable logic blocks (CLBs), one of which is shown schematically in FIG. 3 of the accompanying drawings. Each CLB comprises a programmable logic or gate section (PLS) and a latch LA, and the CLBs (and the PLSs and latches thereof) can be connected together in any desired manner. In each CLB, it is possible to use only the PLS or only the latch LA. Alternatively, it is possible to use both the PLS and latch LA, the former feeding an output signal into the latter. The PLS can be programmed to perform any one of a variety of desired logical operations on up to (say) four input signals supplied thereto. (Alternatively, the PLS may be programmed to perform any two separate ones of a variety of desired logical operations on up to three input signals, provided that the input signals for the two operations are the same.) A PGA of the above-described type (referred to as a logic cell array) is available from Monolithic Memories of Santa Clara, Calif., under the type numbers M2064/M2018.

It is possible to embody the apparatus of FIG. 2 in a PGA of the type mentioned above. Thus, the full adders FA can be implemented by appropriate programming of an appropriate number of PLSs. To maximize hardware use, at least some of the latches LA immediately following the full adders FA can be the latches of the same CLBs whose PLSs form the full adders. However, the bulk of the latches LA of FIG. 2 would comprise the latches of individual CLBs whose PLSs would not be used. There would therefore be a very great wastage of available hardware.

An object of the invention is to provide a pipelined binary adding apparatus in which the number of latches is reduced.

Another object of the invention is to provide a pipelined binary adding apparatus which is well adapted to implementation in the form of a programmable gate array in a manner which minimizes hardware wastage.

A further object of the invention is to provide a pipelined binary adding apparatus having a reduced delay between input and output.

SUMMARY OF THE INVENTION

The invention provides a binary adding apparatus for adding together a plurality of multi-bit input words to produce a multi-bit output word. The apparatus includes a clock generator for producing a clock signal having a clock period, and a plurality of adders each connected to receive bits of equal significance of the input words and all having substantially the same propagation delay, the adders being interconnected in cascaded groups, in the order of significance of the bits of the input words, and the number of adders in each group being such that the total propagation delay through each group is less than the clock period. The apparatus also includes a first set of latches connected to outputs of the adders, the set comprising respective latches each connected to receive a sum bit of respective significance and respective latches each connected to receive a carry-out bit from a respective one of said groups, and an output set of latches for receiving the bits of the output word, the latches of the first and output sets being controlled by the clock generator whereby all the latches output simultaneously, once per clock period, the bits supplied thereto. A processing assembly is connected between the first set of latches and the output set of latches and is operative to combine, during at least one clock period, the bits outputted by the first set of latches to produce the bits of the output word, the processing assembly comprising a plurality of logic units each having a propagation delay which is less than the clock period, and each being operative to carry out one of a plurality of predetermined logic functions.

A preferred embodiment of the invention described in detail below has the advantage that it enables alleviation of the above-mentioned disadvantages. Firstly, it can reduce the number of latches to less than that employed in the apparatus described with reference to FIG. 2. Secondly, it can reduce the delay between input and output to less than that experienced in the case of the apparatus described with reference to FIG. 2. Further, the design of the preferred apparatus lends itself to more efficient hardware usage (as compared to the apparatus described with reference to FIG. 2) when implemented using one or more programmable gate arrays (PGAs) in that the logic units can be implemented in the programmable logic sections (PLSs) of the configurable logic blocks (CLBs).

BRIEF DESCRIPTION OF THE DRAWINGS

The above and other objects, features and advantages of the invention will be apparent from the following description of illustrative embodiments which is to be read in conjunction with the accompanying drawings, in which like reference signs indicate like items throughout, and in which.

DESCRIPTION OF THE PREFERRED EMBODIMENTS

Figure 4:
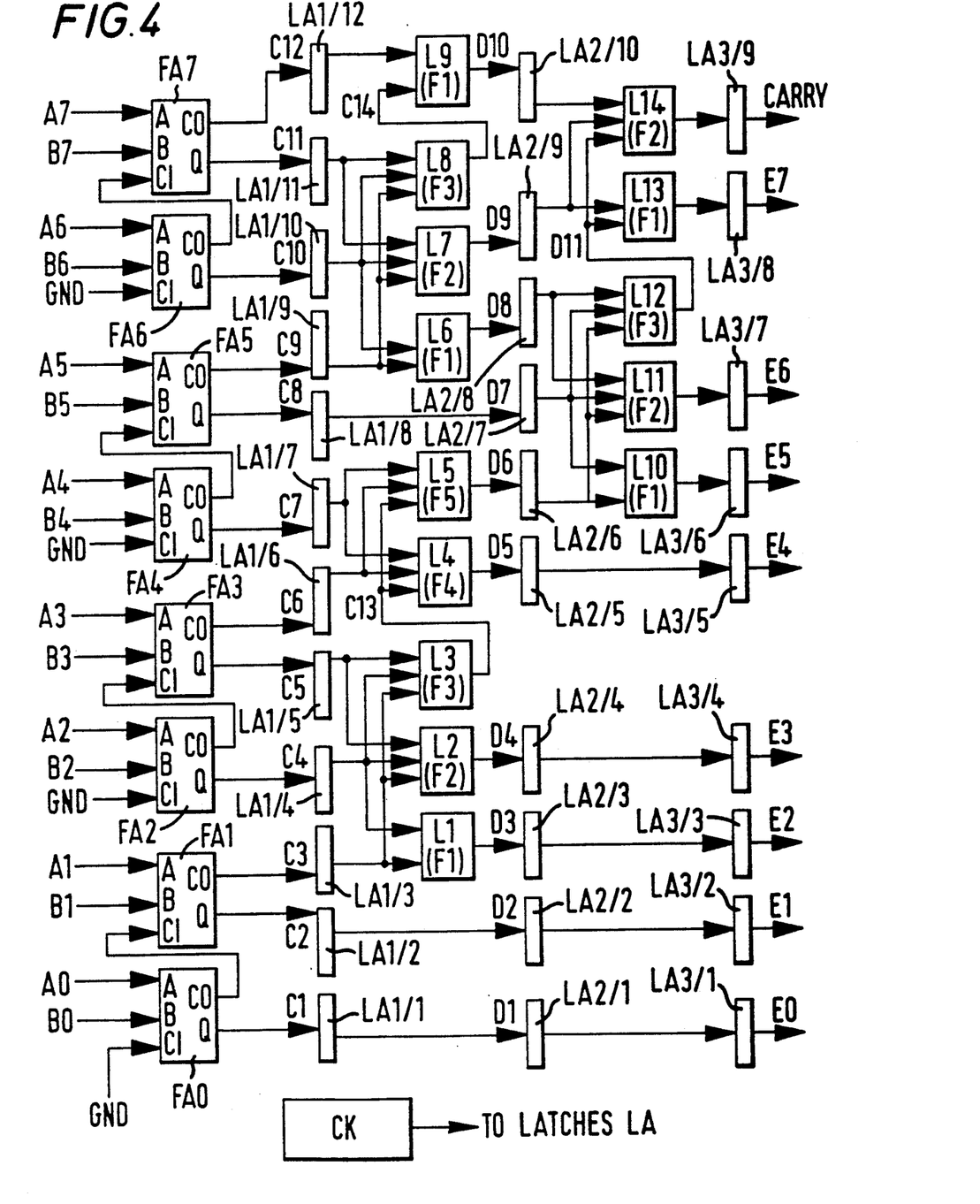
FIG. 4 is a block diagram of a pipelined binary adding apparatus embodying the invention for adding together two 8-bit words.

FIG. 4 shows a pipelined binary adding apparatus embodying the invention for adding together two 8-bit words. The apparatus of FIG. 4 is in some respects the same as that of FIG. 2 and will be described only in so far as it differs therefrom. Items in FIG. 4 designated by the same reference signs as in FIG. 2 are, unless otherwise indicated, the same items and their description will not be repeated.

In FIG. 4, the eight single-bit full adders FA0 to FA7 are all arranged at the front end of the apparatus. That is, the bits A0 to A7 and B0 to B7 of the input words are supplied directly and simultaneously to the inputs A and B of the full adders FA0 to FA7, respectively. No pre-equalizing latches are needed. As a result, the input bits A0 to A7 and B0 to B7 are, in contrast to FIG. 2, added together (in pairs) at once, at the front and, and the results are carried through the apparatus of FIG. 4 and processed as described in detail below until the bits E0 to E7 (and a carry bit) of the output word are produced.

The full adders FA0 to FA7 are interconnected in cascaded groups FA0/FA1, FA2/FA3, FA4/FA5 and FA6/FA7 of two, in the order of significance of the bits of the input words. (In this regard, the significance of the bits is designated below by S0 to S8 where S0 to S7 correspond to the significance of the bits A0/B0 to A7/B7, respectively, and S8 is the significance of a carry-out bit produced from the most significant input bits, namely the bits A7 and B7). As in FIG. 2, the total propagation delay through each of the cascaded groups of two full adders (which delay is the sum of two unit full adder delays) is less than the clock period.

A first set of latches LA1/1 to LA1/12 is connected to outputs of the full adders FA0 to FA7. The first set comprises eight latches (the latches LA1/1, LA1/2, LA1/4, LA1/5, LA1/7, LA1/8, LA1/10 and LA1/11) connected to the sum outputs Q of the full adders FA0 to FA7 to receive sum bits C1, C2, C4, C5, C7, C8, C10 and C11 of respective significance S0 to S7, respectively, and four latches (the latches LA1/3, LA1/6, LA1/9 and LA1/12) connected to the carry-out outputs CO of the full adders FA1, FA3, FA5 and FA7 of higher significance in the four cascaded groups to receive carry-out (look forward carry) bits C3, C6, C9 and C12 from the respective cascaded groups.

The outputs bits C3 to C12 of the first set of latches LA1/1 to LA1/12 are passed to a stage comprising logic units L1 to L9, connected as shown, which results in the production of bits D3 to D10. Bits D3 to D10 together with bits output by latches LA1/1 and LA1/2 designated D1 and D2, respectively, are passed to an intermediate set of latches LA2/1 to LA2/10. The outputs bits D6 to D10 of the intermediate set of latches LA2/6 to LA2/10 are passed to a stage comprising logic units L10 to L14, which results in the production of the bits E5 to E7 (and the carry bit) of the output word, which are passed to latches LA3/6 to LA3/9 of an output set of latches. Simultaneously therewith bits output by latches LA2/1 to LA2/5 are output to latches LA3/1 to LA3/5, respectively, of the output set of latches to produce respective bits E0 to E4 of said output word. As in FIG. 2, all of the latches in FIG. 4 are controlled by the clock generator CK whereby all the latches output simultaneously, once per clock period (i.e. on receipt of each clock pulse) the bits supplied thereto.

It can be seen from FIG. 4 that, in each stage, some of the logic units are cascaded. This leads to the generation in the first stage of bits C13 and C14 (by the logic units L3 and L8, respectively) which are used internally of the first stage in that the bit C13 is passed to the logic units L4 and L5 (which are cascaded with the logic unit L3) and the bit C14 is passed to the logic unit L9 (which is cascaded with the logic unit L8); and to the generation in the second stage of a bit D11 which is used internally of the second stage in that it is passed to the logic units L13 and L14 (which are cascaded with the logic unit L12).

In view of the fact that, as just explained, some cascading of two logic units is effected in each of the stages, the total propagation delay through each such cascaded pair of logic units should be less than the clock period. This requirement will be satisfied if the propagation delays of all of the logic units L1 to L14 are no greater than that of each of the full adders A0 to A7. This is in fact achieved in the apparatus of FIG. 4 in that (i) each of the logic units L1 to L14 either performs the operation of a half adder, or an operation no more prone to delay than that of a full adder, and (ii) each of the logic units L1 to L14 has a number of inputs no greater than that of the full adders.

Using the convention that the symbol $\oplus$ represents the logical exclusive-OR operator, the symbol . represents the logical AND operator and the symbol + represents the logical OR operator, the logic functions performed by the logic units L1 to L14 can be defined by the following Boolean equations:

| L1  | D3 =    | $C3 \oplus C4$                              |
|-----|---------|---------------------------------------------|
| L2  | D4 =    | $C5 \oplus (C3 \cdot C4)$                   |
| L3  | C13 =   | $C3 \cdot C4 \cdot C5$                      |
| L4  | D5 =    | $(C6 \oplus C7 \oplus C13) + (C6 \cdot C7 \cdot C13)$ |
| L5  | D6 =    | $C6 \cdot C7 + C6 \cdot C13 + C7 \cdot C13$ |
| L6  | D8 =    | $C9 \oplus C10$                             |
| L7  | D9 =    | $C11 \oplus (C9 \cdot C10)$                 |
| L8  | C14 =   | $C9 \cdot C10 \cdot C11$                    |
| L9  | D10 =   | $C12 \oplus C14$                            |
| L10 | E5 =    | $D6 \oplus D7$                              |
| L11 | E6 =    | $D8 \oplus (D7 \cdot D6)$                   |
| L12 | D11 =   | $D6 \cdot D7 \cdot D8$                      |
| L13 | E7 =    | $D9 \oplus D11$                             |
| L14 | Carry = | $D10 \oplus (D9 \cdot D11)$                 |

The above logic functions, and the fact that they each comprise one of five individual functions F1 to F5, are explained below.

Considering the bits outputted by the latches LA1/1 to LA1/12 of the first set thereof in turn, the bits C1 and C2 are the two least significant bits (significance S0 and S1, respectively) E0 and E1 of the output word and need only be post-equalized (by the latches LA2/1 and LA3/1). Thus, the bits C1 and C2 are not subjected to processing in either the first stage of logic units L1 to L9 or the second stage of logic units L10 to L14.

The logic unit L1 performs a single bit addition of the bits C3 and C4, which are of the same significance (S2). This is because the bit C4 results from addition of the input bits A2 and B2 of significance S2 and the bit C3 is the carry-out bit resulting from addition of the input bits A1 and B1 of significance S1. As indicated above, the operation or logic function performed by the logic unit L1 is defined by the Boolean equation D3=C3⊕C4. That is, the logic unit L1 acts as a half adder.

The logic units L6, L9, L10 and L13 perform the same logic function (though on different bits) as the logic unit L1. This function, hereinafter referred to as the function F1, can be expressed in general terms by the Boolean equation O=I1⊕I2, where O is the value of the output bit and I1 and I2 are the values of the respective input bits (which both have the same significance).

The logic unit L2 compares the bits C3 and C4 (each of significance S2) with the bit C5 (of significance S3) to see if there is a carry bit to add to the bit C5. That is, the logic unit L2 acts as an add and carry circuit, performing a one bit add with the look ahead carry bit of the previous stage. This logic function is defined, as indicated above, by the Boolean equation D4=C5⊕(C3·C4).

The logic units L7, L11 and L14 perform the same logic function (though on different bits) as the logic unit L2. This function, hereinafter referred to as the function F2, can be expressed in general terms by the Boolean equation O=I1⊕(I2·I3), where O is the value of the output bit and I1, I2 and I3 are the values of the respective input bits, I2 and I3 being of one bit less significance than I1.

The logic unit L3 performs a look ahead carry operation for the next stage. It determines from the bits C3 and C4 (both of significance S2) and the bit C5 (of significance S3) whether there is a carry bit (C13) for the next stage (of significance S4). As indicated above, the logic function performed by the logic unit L3 is defined by the Boolean equation C13=C3·C4·C5.

The logic units L8 and L12 perform the same logic function F3 as the logic unit L3. This function, hereinafter referred to as the function F3, can be expressed in general terms by the Boolean equation O=I1·I2·I3, where O is the value of the output bit and I1, I2 and I3 are the values of the respective input bits, I1 and I2 both being of one bit less significance than I3.

Each of the logic units L4 and L5 receives the same three bits, namely the bits C13, C6 and C7, all of which are of the same significance, namely S4. The logic unit L4 does a sum operation on these bits to produce a sum bit D5 of significance S4, and the logic unit L5 does a carry operation on these bits to produce a carry bit D6 of significance S5 for the next stage. As indicated above, timing restrictions (inability to cascade further within one clock period) dictate that another stage is needed.

The logic functions F4 and F5 performed by the logic units L4 and L5 are unique to these blocks (for the particular form of apparatus shown in FIG. 4) and are defined by the Boolean equations for D5 and D6 given above.

It is to be noted that the first stage of logic units, namely that constituted by the logic units L1 to L9, does not include a logic unit for processing the bit C8. The bit C8 is passed directly to the latch LA2/7 to form a bit D7, which is of course the same as the bit C8.

Figure 5:
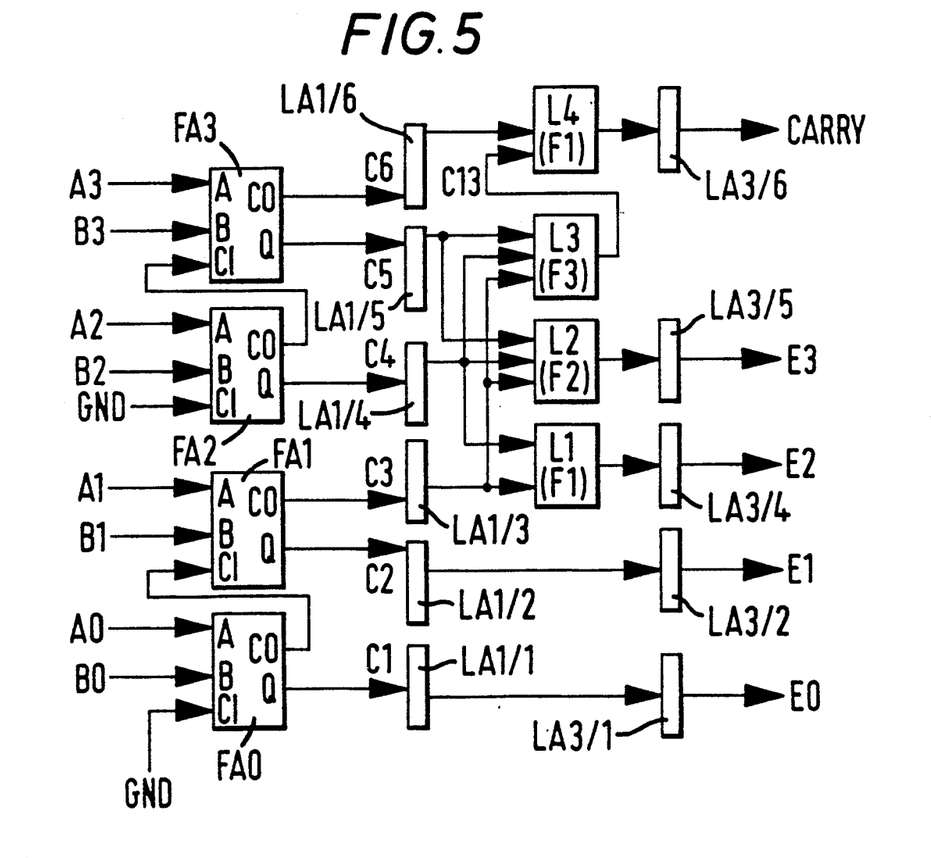
FIG. 5 is a block diagram of a pipelined binary adding apparatus embodying the invention for adding together two 4-bit words.

The logic units L6 to L9 for processing the bits C9 to C12 perform, as mentioned before, the functions F1, F2, F3 and F1, respectively. It will thus be seen that, as far up as the bit C11, starting with the bit C3, the order of the functions performed by the logic units, in ascending order of significance, follows the sequence F1, F2, F3, F4, F5 and "none". Above the bit C11, however, the sequence breaks down in that the next function is F1 rather than F4. This irregularity is, however, due only to the fact that the sequence ends at this point. If the structure of FIG. 4 were extended upwardly to an indefinite extent, i.e. if the number of bits in the input words were increased by an indefinite extent, it would be found that the above sequence (F1, F2, F3, F4, F5 and "none") would repeat itself indefinitely and would break down only towards the end. Similarly, if the number of bits of the input words were reduced, for example decreased to four as shown in FIG. 5, the sequence would break down earlier. Thus, in FIG. 5, the sequence breaks down after F3 (in the logic unit L3), the unit L4 in this case performing the logic function F1.

In the second stage of logic units, namely that constituted by the logic units L10 to L14 (which stage is the third pipelining stage), the logic functions performed by the respective units each correspond to one of the functions performed in the first stage of logic units, more specifically to one of the functions F1 to F3. This stage sorts out the bits D6 to D10 and adds, with a carry, the bits of equal significance. That is, the stage as a whole performs the binary addition:

[D10, D9, D8, D7]+[O, O, O, D6]

which is a one bit add to a 4-bit number, the bits D10, D9, D8, D7 and D6 being of significance S8, S7, S6, S5 and S5, respectively.

It can be seen from a comparison of FIGS. 2 and 4 that the apparatus of FIG. 4 enables the number of latches to be significantly reduced by a more efficient use of equalizing latches. Specifically, the number of latches is reduced from 48 to 31. This is at the cost of more logic being provided. However, the logic is simple and easy to implement. Moreover, if the apparatus of FIG. 4 is implemented using programmable gate arrays (PGAs), there need be little or no extra hardware cost. In this regard, as explained above, the approach of FIG. 2 involves much redundant hardware in that the programmable logic sections (PLSs) of most of the configurable logic blocks (CLBs) are not used. With the apparatus of FIG. 4, since none of the logic units L1 to L14 needs more than three inputs, all of them can be programmed in the PLSs, thereby allowing the CLBs to be used more efficiently. Moreover, recalling that (as explained above) two logic functions can be programmed into a single PLS if they each require no more than three inputs and if those three inputs are the same for the two logic functions, it is possible for some pairs of the logic units, specifically the pairs L1/L2 (or L2/L3), L4/L5, L6/L7 (or L7/L8), L10/L11 (or L11/L12) and L13/L14, each to be programmed into the same PLS.

It should be noted that, if more than two logic stages can be cascaded between sets of latches and/or if logic units having more than three inputs can be used, a greater saving in the number of pipeline stages and the number of latches may be achievable. Also, the greater the number of bits in the input words, the more efficient the design. This might be the case if use were made of a PGA having larger PLSs such that each pair of cascaded single-bit full adders could be implemented as a two-bit full adder in a single PLS and more complex logic functions (requiring more than three inputs) could be performed by the logic units.

The apparatus of FIG. 4 (or that of FIG. 5) could be modified by replacing the full adders FA0 to FA7 (or FA0 to FA3) by adding components other than full adders. Any adder that can add plural bits or any logic that can perform such an adding function can be employed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A binary adding apparatus for adding together a plurality of multi-bit input words to produce a multi-bit output word, the apparatus comprising:
   clock generating means for producing a clock signal having a clock period;
   a plurality of adding means for each adding bits of said multi-bit input words of equal significance to produce a sum bit, said plurality of adding means all having substantially the same propagation delay and being arranged in a plurality of cascaded groups in the order of significance of the bits of the input words, each of said plurality of cascaded groups being operative to produce a respective carry-out bit, the number of the adding means in each of said plurality of cascaded groups being selected such that the total propagation delay through said plurality of cascaded groups is less than said clock period;

a plurality of first latching means for each latching a sum bit or respective significance output by a respective one of said plurality of adding means;

a plurality of second latching means for each latching a carry-out bit output by a respective one of said plurality of cascaded groups of adding means;

a plurality of output word latching means for latching the bits of said multi-bit output word;

said plurality of first latching means, said plurality of second latching means and said plurality of output word latching means being controlled by said clock generating means to output the bits supplied thereto simultaneously once each said clock period; and logic processing means for logically combining bits output by said plurality of first latching means and said plurality of second latching means to produce at least some of said bits of said multi-bit output word, said logic processing means including a plurality of logic means for each performing at least one of a plurality of predetermined logic functions and each having a propagation delay less than said clock period.

2. Apparatus according to claim 1, wherein at least one of said plurality of logic means comprises means for performing a predetermined logic function defined by the Boolean equation $O = I1 \oplus I2$, where O represents the value of an output bit thereof, I1 represents the value of a first input bit provided thereto, the symbol $\oplus$ represents the logical exclusive-OR operator, and I2 represents the value of a second input bit provided thereto, said means for performing a predetermined logic function being so connected that the first and second input bits have the same significance.

3. Apparatus according to claim 2, wherein said means for performing a predetermined logic function is coupled with one of said plurality of first latching means to receive therefrom, as said first input bit, a sum bit of lesser significance derived from an adding means of one of said plurality of cascaded groups; and with one of said plurality of second latching means to receive therefrom, as said second input bit, a carry-out bit derived from one of said plurality of cascaded groups of adding means disposed immediately below, in said order of significance, said one of said plurality of cascaded groups of adding means from which said sum bit was derived.

4. Apparatus according to claim 1, wherein at least one of said logic means comprises means for performing a predetermined logic function represented by the Boolean equation $O = I1 \oplus (I2 \cdot I3)$, where O represents the value of an output bit thereof, I1 represents the value of a first input bit provided thereto, the symbol $\oplus$ represents the logical exclusive-OR operator, I2 represents the value of a second input bit provided thereto, the symbol . represents the logical AND operator, and I3 represents the value of a third input bit provided thereto, said means for performing a predetermined logic function being so connected that the second and third input bits provided thereto are each of one bit less significance than the first input bit.

5. Apparatus according to claim 4, wherein said means for performing a predetermined logic function is coupled with two of said plurality of first latching means such that the first and the second input bits to said means for performing a predetermined logic function are sum bits of different significance derived from respective adding means of one of said plurality of cascaded groups of adding means; and with one of said plurality of second latching means to receive therefrom, as said third input bit, a carry-out bit from one of said plurality of cascaded groups of adding means disposed immediately below, in said order of significance, said one of said plurality of cascaded groups of said adding means from which said sum bits were derived.

6. Apparatus according to claim 1, wherein at least one of said logic means comprises means for performing a predetermined logic function represented by the Boolean equation $O = I1 \cdot I2 \cdot I3$, wherein O represents the value of an output bit thereof, the symbol · represents the logical AND operator and I1, I2 and I3 represent the values of first, second and third input bits provided thereto, respectively said means for performing a predetermined logic function being so connected that the first and second input bits provided thereto are each of one bit less significance than the third input bit provided thereto.

7. Apparatus according to claim 6, wherein said means for performing a predetermined logic function is coupled with two of said plurality of first latching means to receive therefrom, as said second and third input bits, sum bits of different significance derived from respective adding means of one of said plurality of cascaded groups of adding means; and with one of said plurality of second latching means to receive therefrom, as said first input bit, a carry-out bit from one of said plurality of cascaded groups of adding means disposed immediately below, in said order of significance, said one of said plurality of cascaded groups of adding means from which said sum bits were derived.

8. Apparatus according to claim 1, wherein said logic processing means comprises plural stages of said logic means separated by at least one further plurality of latching means controlled by said clock generator means.

9. Apparatus according to claim 8, wherein all of said plural stages of said logic means comprise logic means operative to carry out at least some of said plurality of predetermined logic functions.

10. Apparatus according to claim 1, wherein some of said logic means are connected in at least one cascaded group, the number of said logic means in said at least one cascaded group of said logic means being such that the total propagation delay through each said group is less than said clock period.

11. Apparatus according to claim 10, wherein each logic means has a propagation delay no greater than that of each of said adding means and the number of said logic means in each of said at least one cascaded group of said logic means is no greater than the number of said adding means in each of said plurality of cascaded groups thereof.

12. Apparatus according to claim 1 wherein at least some of said adding means, said first latching means, said second latching means, said output word latching means and said logic means are constituted by at least one programmable logic array.

13. Apparatus according to claim 12, wherein said at least one programmable logic array comprises a plurality of configurable logic blocks each having a latching section and a programmable logic section, said first and second latching means and said output word latching means being constituted by the latching sections of said configurable logic blocks and said adding means and logic means being constituted by the programmable logic sections of said configurable logic blocks.

14. Apparatus according to claim 13, wherein at least two of said logic means have common inputs and are both formed by the same programmable logic section.

15. Apparatus according to claim 1, wherein said adding means comprise full adding means.

16. Apparatus according to claim 15, wherein said full adding means are single-bit full adding means each having a sum bit output and each of said first latching means is coupled to receive a sum bit output of a respective of one of said full adding means.

17. A binary adding apparatus for adding together a plurality of multi-bit input words to produce a multi-bit output word, the apparatus comprising:
   clock generating means for producing a clock signal having a clock period;
   a plurality of adding means for each adding bits of said multi-bit input words of equal significance to produce a sum bit, said plurality of adding means all having substantially the same propagation delay, at least some of said plurality of adding means being arranged in at least one cascaded group in the order of significance of the bits of the input words, said at least one cascaded group being operative to produce a respective carry-out bit, the number of the adding means in said at least one cascaded group being selected such that the total propagation delay through said at least one cascaded group is less than said clock period;
   a plurality of first latching means for each latching a sum bit of respective significance output by a respective one of said plurality of adding means;
   at least one second latching means for latching a carry-out bit output by a respective one of said at least one cascaded group of adding means;
   a plurality of output word latching means for latching the bits of said multi-bit output word;
   said plurality of first latching means, said at least one second latching means and said plurality of output word latching means being controlled by said clock generating means to output the bits supplied thereto simultaneously once each said clock period; and
   logic processing means for logically combining bits output by at least one of said plurality of first latching means and said at least one second latching means to produce at least one of said bits of said multi-bit output word, said logic processing means including at least one logic means for performing at least one of a plurality of predetermined logic functions and having a propagation delay less than said clock period.

18. Apparatus according to claim 17, wherein said at least one logic means comprises means for performing a predetermined logic function defined by the Boolean equation $O = I1 \oplus I2$, where O represents the value of an output bit thereof, I1 represents the value of a first input bit provided thereto, the symbol $\oplus$ represents the logical exclusive-OR operator, and I1 represents the value of a second input bit provided thereto, said means for performing a predetermined logic function being so connected that the first and second input bits have the same significance.

19. Apparatus according to claim 18, wherein said means for performing a predetermined logic function is coupled with one of said plurality of first latching means to receive therefrom, as said first input bit, a sum bit derived from one of said plurality of adding means and is coupled with said at least one second latching means to receive therefrom, as said second input bit, a carry-out bit derived from a respective one of said at least one cascaded group of adding means such that said cascaded group of adding means is disposed immediately below, in said order of significance, said adding means from which said sum bit was derived.

* * * * *